United States Patent
Polston et al.

[19]

[11] Patent Number: 5,936,834
[45] Date of Patent: Aug. 10, 1999

[54] DEVICE AND METHOD FOR FIELD BALANCING INDIVIDUAL SINGLE PHASE METER LOADS IN A THREE PHASE MULTIPLE METER STACK

[75] Inventors: Larry D. Polston, Nicholasville, Ky.; Larry E. Ward, Murfreesboro, Tenn.; Alfonso H. Loya, Naucalpan, Mexico

[73] Assignee: Square D Company, Palatine, Ill.

[21] Appl. No.: 08/998,851

[22] Filed: Dec. 29, 1997

[51] Int. Cl.⁶ ...................................................... H02B 1/00
[52] U.S. Cl. .......................... 361/664; 361/660; 361/668; 361/671
[58] Field of Search ...................................... 361/622, 625, 361/644, 614, 657, 660, 664, 665, 666, 668; 174/71 B; 312/257.1; 307/14

[56] References Cited

U.S. PATENT DOCUMENTS

| | | | |
|---|---|---|---|
| 2,145,557 | 1/1939 | Rypinski | 361/671 |
| 2,349,645 | 5/1944 | Young | 361/660 |
| 3,322,878 | 5/1967 | Christensen | 361/660 |
| 3,628,097 | 12/1971 | Kobryner | 361/660 |
| 3,707,653 | 12/1972 | Coffey et al. | 361/622 |
| 4,041,358 | 8/1977 | Donahue et al. | 361/660 |
| 4,369,484 | 1/1983 | Fugate et al. | 361/660 |
| 4,413,306 | 11/1983 | Erickson | 361/648 |
| 5,414,590 | 5/1995 | Tajali | 361/669 |

*Primary Examiner*—Leo P. Picard
*Assistant Examiner*—Boris L. Chervinsky
*Attorney, Agent, or Firm*—David R. Stacey; Lawrence I. Golden; Larry T. Shrout

[57] ABSTRACT

A meter stack wherein each single phase meter base in the meter stack can be selectively connected in the field to any one of the A-B, A-C or B-C phase combinations of the vertical three phase bus bars in the meter stack by moving only the meter base line connectors. The vertical bus bars of the meter stack lie in a common plane and are equally spaced apart from one another. The vertical center line of each meter base in the meter stack coincides with the center line of the center vertical bus bar of the meter stack. Each of the two line side terminals of each meter base is associated with one of the outside vertical bus bars, and is located approximately half way between it's associated outside vertical bus bar and the center bus bar. A generally "Z" shaped line connector attached to each of the line terminals can be easily rotated between its associated outside bus bar and the center bus bar, thus easily allowing a change in the A-B, A-C or B-C phase combinations of each meter base.

6 Claims, 3 Drawing Sheets

5,936,834

DEVICE AND METHOD FOR FIELD BALANCING INDIVIDUAL SINGLE PHASE METER LOADS IN A THREE PHASE MULTIPLE METER STACK

FIELD OF THE INVENTION

The present invention relates to multiple meter base stacks and specifically to the field load balancing of individual single phase meters within a three phase meter stack.

BACKGROUND OF THE INVENTION

Utility companies provide single phase electric power to tenant facilities, such as apartment buildings or small commercial offices, through metering centers. Each metering center include a main disconnect means and overload protection, such as a circuit breaker or fused switch, and an individual electric meter for each tenant receiving electric service. The utility company supplies three phase power to a main service panel which houses the main disconnect and overload protection devices and a three phase feeder bus connected to the load side of the overload protection device. Each tenant's single phase power is taken from one of the A-B, A-C or B-C phase combinations of the three phase supply through individual meters housed in a meter module or meter stack which is added to the main service panel. It is important that the tenant loads be balanced between the A-B, A-C and B-C phase combinations to prevent overheating of conductors and for more efficient use of electricity. This has generally been accomplished by attempting to have an equal number of tenants on each of the A-B, A-C and B-C phase combinations. Due to cost, the most common method of load balancing has been to provide meter modules having two or more meter bases and a single phase bus which can be connected to one of the A-B, A-C or B-C phase combinations of the three phase feeder bus. In this configuration, at least one meter module is required for each of the A-B, A-C and B-C phase combinations in order to provide at least one meter connection in each of the A-B, A-C and B-C phase combinations. An alternative is to provide a meter module having a three phase bus with one meter base connected to each of the three A-B, A-C and B-C phase combinations. Meter modules of these types are taught in U.S. Pat. No. 3,628,097, which issued on Dec. 24, 1971, to Kobryner, and U.S. Pat. No. 4,041,358, which issued Aug. 9, 1977, to Donahue et al.

Neither of these configurations adequately address situations wherein the number of tenants is not a multiple of three or where changes in tenant usage or other events might significantly alter the load balance and require a rebalancing of the load based on calculated tenant loads. The meter bases in the devices described above are provided with factory made line connections which are not intended to be changed in the field and are generally difficult to work with. Therefore, the only method of rebalancing the load is to disconnect one or more tenants feeder cables from the load side of their meter bases and reconnect them to the load side of another meter base which is connected to a different one of the A-B, A-C or B-C phase combinations. This can be a difficult and time consuming job which requires the affected tenant or tenants to be without power for the time required to make the necessary load balancing changes. It would therefore be desirable to have a meter base module with provisions for easily and quickly changing the meter base line connections of any meter base in the module between any of the three A-B, A-C or B-C phase combinations.

SUMMARY OF THE INVENTION

The present invention provides a meter stack wherein each meter base in the meter stack can be electrically connected to any one of the A-B, A-C or B-C phase combinations of the vertical three phase bus bars in the meter stack by moving only the meter base line connectors. The vertical bus bars lie in a common plane and are equally spaced apart from one another. The vertical center line of each meter base in the module coincides with the center line of the center vertical bus bar of the meter module. Each of the two line side terminals of each meter base is associated with one of the outside vertical bus bars, and is located half way between it's associated outside vertical bus bar and the center bus bar. A generally "Z" shaped line connector attached to each of the line terminals can be easily rotated between its associated outside bus bar and the center bus bar, thus easily allowing a change in the A-B, A-C or B-C phase combinations of each meter base.

Figure 1:
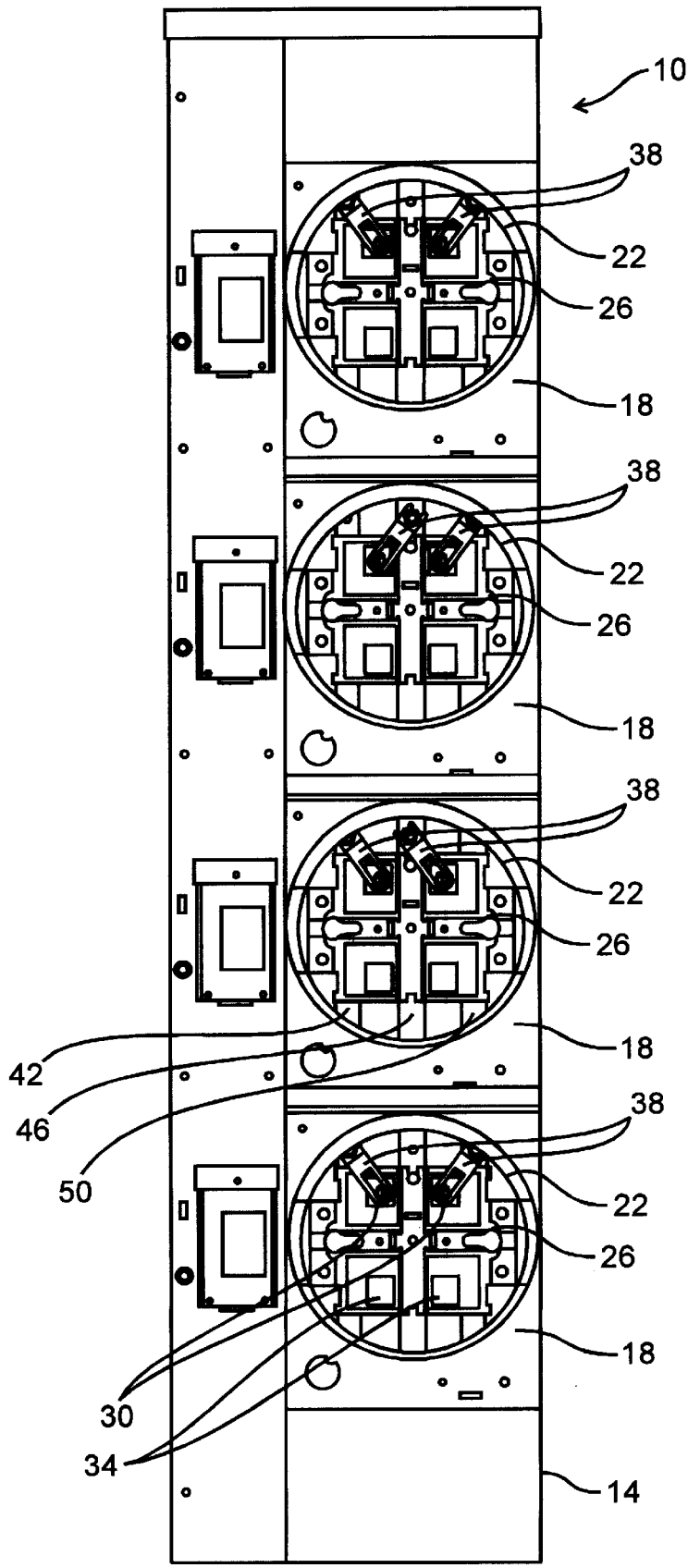
FIG. 1 is a front view of a meter stack in accordance with the present invention.

Before one embodiment of the invention is explained in detail, it is to be understood that the invention is not limited in its application to the details of construction and description or as illustrated in the drawings. The invention is capable of other embodiments and of being practiced or being carried out in various other ways. Also, it is to be understood that the phraseology and terminology used herein is for the purpose of description and should not be regarded as limiting.

DESCRIPTION OF THE PREFERRED EMBODIMENT

FIG. 1 illustrates a meter stack of the present invention generally indicated by reference numeral 10. The meter stack 10 includes an enclosure 14 provided with meter covers 18 each having an opening 22 for receiving an electric meter. A meter base 26 with its line terminals 30, load terminals 34 and line connectors 38 and the vertical bus bars 42, 46 and 50 can be seen through each meter opening 22. The vertical bus bars 42, 46 and 50 are connected to a horizontal bus (not shown) which in turn is connected to the load side of the main disconnect device in the main service panel.

Figure 2:
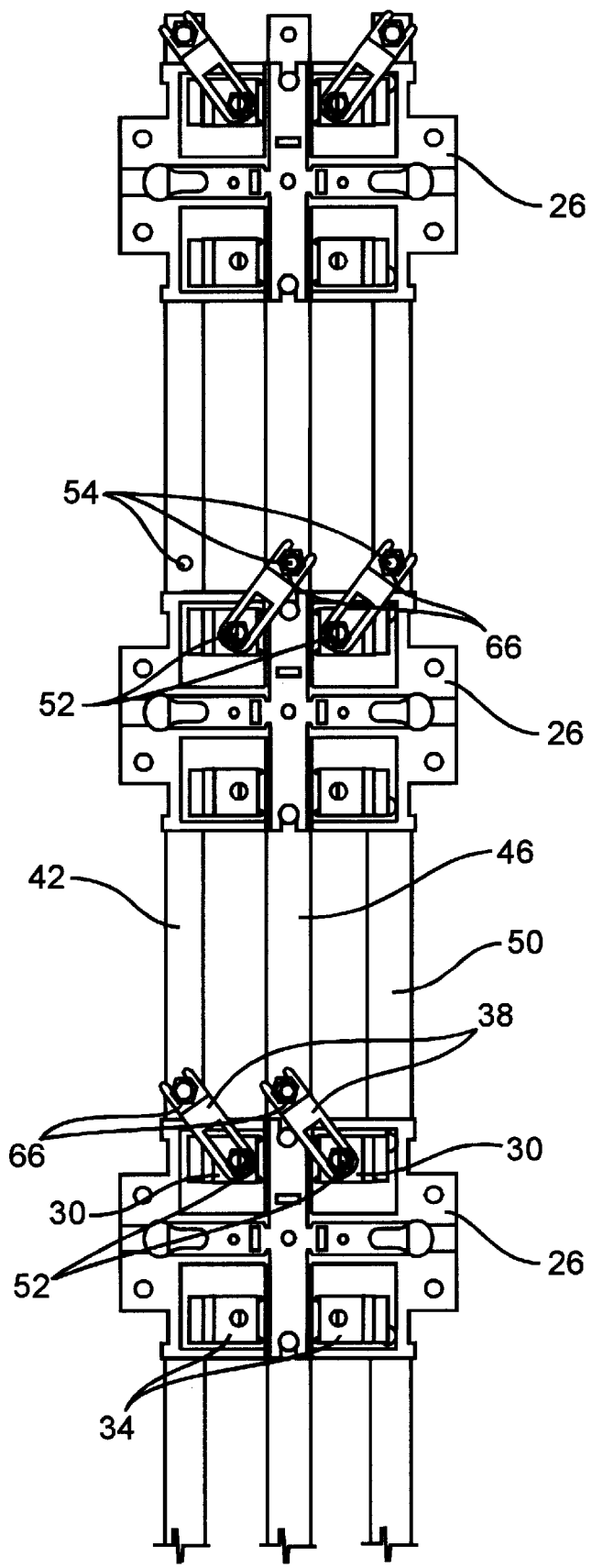
FIG. 2 is a front view of the vertical busing and meter bases of a meter stack in accordance with the present invention.

FIG. 2 illustrates the arrangement of the three phase vertical bus bars 42, 46 and 50 with respect to the meter bases 26 in the meter stack 10. The vertical center line of each meter base 26 coincides with the center line of the center bus bar 46 and a line terminal screw 52 of each of the line terminals 30 of each base 26 is positioned half way between the center bus bar 46 and the two outside bus bars 42 and 50. Each of the bus bars 42, 46 and 50 has a fixed fastener such as a stud 54 adjacent the line terminals 30 of each meter base 26 such that the studs 54 associated with one meter base 26 are aligned and extend upward toward the meter bases 26. Each meter base line terminal 30 is connected to one of the vertical bus bars 42, 46 or 50 by a line connector 38.

Figure 3:
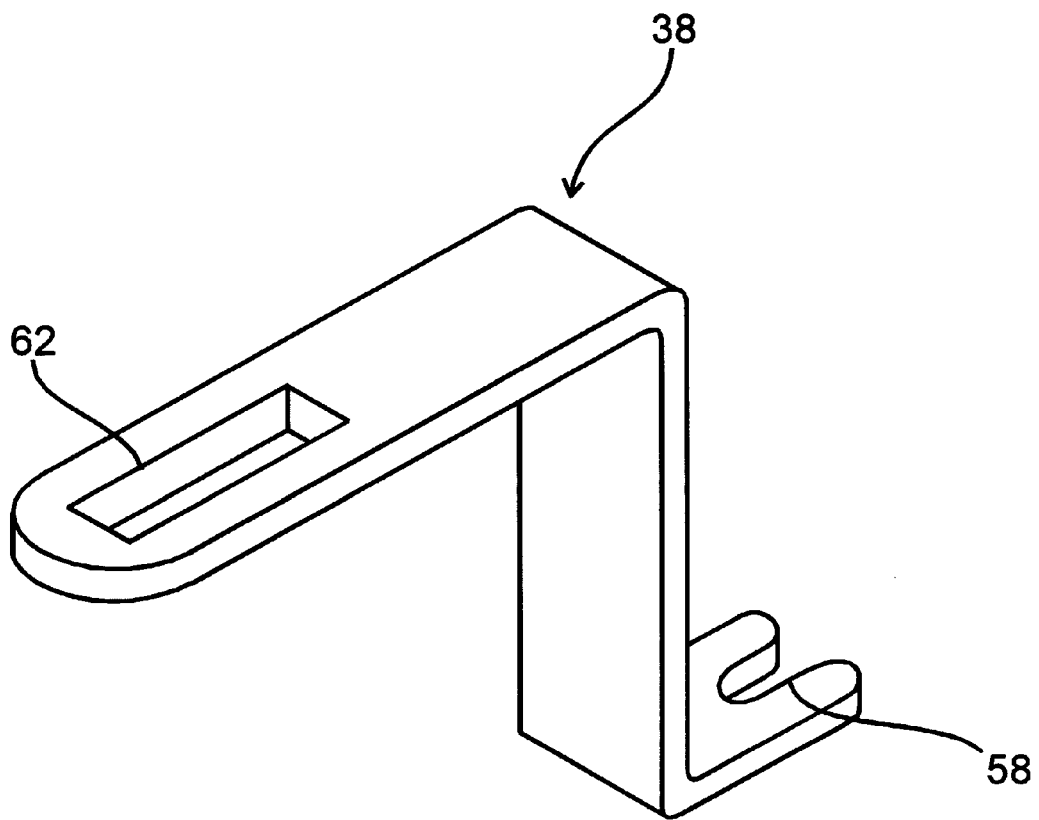
FIG. 3 is an isometric view of the meter base line connector in accordance with the present invention.

Referring now to FIG. 3 it can be seen that the line connector 38 is generally "Z" shaped and in the preferred embodiment has a slotted opening 58 at one end and an elongated hole 62 at the other end. The elongated hole 62 receives the terminal screw 52 for securing the line connector 38 to the meter base line terminal 30 with a threaded fastener and the slotted opening 58 slidably receives the stud 54 of one of the vertical bus bars 42, 46 or 50 and is secured thereto by a nut 66.

When it has been determined that the load is not properly balanced between the tenants, the load of each tenant should be measured or calculated. Using the measured or calculated load information one or more tenants can be switched to another of the A-B, A-C or B-C phase combinations to more accurately balance the load. This is accomplished by turning OFF the main disconnect, removing the selected tenant's electric meter from its meter base 26, loosening the threaded fasteners of the desired line connector 38 and rotating the line connector 38 to the other vertical bus bar 42, 46 or 50 to which it can be connected, retightening the threaded fasteners, replacing the tenant's electric meter in the meter base 26 and turning the main disconnect back ON.

We claim:

1. A vertical meter stack designed for easily field balancing tenant loads, said meter stack comprising:

a vertical three phase bus having two outside bus bars and a center bus bar arranged in a common plane and being evenly space apart;

a plurality of meter bases, each having it's vertical center line coincident with a vertical center line of said center bus bar, each said meter base having two line terminals wherein one said line terminal is associated with each of said outside bus bars and is evenly spaced between it's associated said outside bus bar and said center bus bar; and a plurality of line connectors, one said line connector being attached to each of said line terminal of each said meter base such that any of said line connectors can be selectively connected to said outside bus bar associated with it's line terminal or said center bus bar, thus permitting an easy balancing of tenant loads.

2. The meter stack of claim 1 wherein said line connector is generally Z-shaped.

3. The meter stack of claim 2 wherein each said line connector defines an open slot at one end and an elongated hole at the other end.

4. The meter stack of claim 1 wherein each said vertical bus bar has a fixed threaded fastener located adjacent said line terminals of each said meter base, said fixed threaded fasteners for attaching said line connectors to said vertical bus bars.

5. The meter stack of claim 1 wherein each said line terminal includes a line terminal fastener for attaching said line connectors to said line terminal, each said line terminal fastener being located approximately equidistant said center bus bar and one of said outside bus bars such that said terminal connector can be pivoted about said line terminal fastener for making an electrical connection with either said center bus bar or said outside bus bar.

6. A method for balancing the single phase tenant loads of a three phase metering center comprising the steps of:

calculating the single phase load of each tenant connected to the metering center;

selecting one or more tenants which can be changed to a different one of the A-B, A-C or B-C phase combinations to balance the load;

turning the metering center main disconnect OFF;

removing the electric meter of the selected tenants;

loosening the selected line connector fasteners of the selected tenant's meter base;

rotating the selected line connector such that it contacts the other of it's two selectable bus bars;

tightening the selected line connector fasteners;

replacing the selected tenant's electric meter; and turning the metering center main disconnect ON.

* * * * *